US011276004B2

(12) United States Patent
Chen et al.

(10) Patent No.: US 11,276,004 B2
(45) Date of Patent: Mar. 15, 2022

(54) METHOD AND APPARATUS FOR MONITORING SYSTEM

(71) Applicant: BEIJING BAIDU NETCOM SCIENCE AND TECHNOLOGY CO., LTD., Beijing (CN)

(72) Inventors: Yun Chen, Beijing (CN); Bo Wang, Beijing (CN); Dong Wang, Beijing (CN); Xianping Qu, Beijing (CN); Xuanyou Guo, Beijing (CN); Yongqian Sun, Beijing (CN); Yangsha Wan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 758 days.

(21) Appl. No.: 15/428,986

(22) Filed: Feb. 9, 2017

(65) Prior Publication Data
US 2018/0075356 A1 Mar. 15, 2018

(30) Foreign Application Priority Data
Sep. 9, 2016 (CN) .......................... 201610814685.2

(51) Int. Cl.
*G06N 5/04* (2006.01)
*G06N 20/00* (2019.01)

(52) U.S. Cl.
CPC ............ *G06N 5/04* (2013.01); *G06N 20/00* (2019.01)

(58) Field of Classification Search
CPC .......... G06F 11/30; G06N 5/04; G06N 99/00; H04L 12/26
See application file for complete search history.

(56) References Cited

U.S. PATENT DOCUMENTS

2016/0307191 A1* 10/2016 Turgeman ............ G06Q 20/382
2016/0335550 A1* 11/2016 Achin ...................... G06N 5/02
(Continued)

FOREIGN PATENT DOCUMENTS

| CN | 101729301 A | 6/2010 |
| CN | 104391860 A | 3/2015 |

OTHER PUBLICATIONS

Dasgupta, Dipankar, and Stephanie Forrest. "Novelty detection in time series data using ideas from immunology." Proceedings of the international conference on intelligent systems. 1996 (Year: 1996).*
(Continued)

*Primary Examiner* — Kamran Afshar
*Assistant Examiner* — Randall K. Baldwin
(74) *Attorney, Agent, or Firm* — Seed IP Law Group LLP

(57) ABSTRACT

A method and apparatus for monitoring a system are provided. The method includes: acquiring a series of historical status index data of a monitored system during at least one data collection period; introducing the series of historical status index data into a pre-trained recommended feature extraction model to perform a matching operation, to obtain a feature extraction algorithm matching the series of historical status index data as a recommended feature extraction algorithm; determining a normal value range of feature values obtained by performing feature extraction on the series of status index data of the monitored system according to the recommended feature extraction algorithm; and monitoring the monitored system according to the recommended feature extraction algorithm and the normal value range.

18 Claims, 5 Drawing Sheets

(56) References Cited

U.S. PATENT DOCUMENTS

| | | | | |
|---|---|---|---|---|
| 2016/0350657 | A1* | 12/2016 | Gupta | G06F 11/3604 |
| 2016/0359740 | A1* | 12/2016 | Parandehgheibi | G06F 16/2322 |
| 2017/0132194 | A1* | 5/2017 | Lee | H04L 67/104 |
| 2017/0359366 | A1* | 12/2017 | Bushey | H04W 4/38 |
| 2018/0046926 | A1* | 2/2018 | Achin | G06N 5/02 |
| 2018/0060744 | A1* | 3/2018 | Achin | G06N 20/00 |

OTHER PUBLICATIONS

Idé, et al. "Eigenspace-based anomaly detection in computer systems." Proceedings of the tenth ACM SIGKDD international conference on Knowledge discovery and data mining. ACM, 2004, pp. 440-449. (Year: 2004).*

Liao, T. Warren. "Clustering of time series data—a survey." Pattern recognition 38.11 (2005): pp. 1857-1874 (Year: 2005).*

Guan, Qiang, and Song Fu. "Adaptive anomaly identification by exploring metric subspace in cloud computing infrastructures." 2013 IEEE 32nd International Symposium on Reliable Distributed Systems. IEEE, 2013, pp. 205-214. (Year: 2013).*

Fernandes et al. "Autonomous profile-based anomaly detection system using principal component analysis and flow analysis." Applied Soft Computing 34 (2015): pp. 513-525. (Year: 2015).*

Gonzalez, Fabio, Dipankar Dasgupta, and Robert Kozma. "Combining negative selection and classification techniques for anomaly detection." Proceedings of the 2002 Congress on Evolutionary Computation. CEC'02 (Cat. No. 02TH8600). vol. 1. IEEE, 2002 (Year: 2002).*

Chen, Xiao-yun, and Yan-yan Zhan. "Multi-scale anomaly detection algorithm based on infrequent pattern of time series." Journal of Computational and Applied Mathematics 214.1 (2008): pp. 227-237 (Year: 2008).*

Aghabozorgi, Saeed, Ali Seyed Shirkhorshidi, and Teh Ying Wah. "Time-series clustering-a decade review." Information Systems 53 (2015): 16-38. (Year: 2015).*

Xu, Yi-qiong, Bi-cheng Li, and Bo Wang. "Face recognition by fast independent component analysis and genetic algorithm." The Fourth International Conference onComputer and Information Technology, 2004. CIT'04 . . . IEEE, 2004: 194-198 (Year: 2004).*

Geese, Marc, et al. "Feature extraction in laser welding processes." 2008 11th International Workshop on Cellular Neural Networks and Their Applications. IEEE, 2008: 196-201 (Year: 2008).*

Harrison, Richard JP, et al. "Feature extraction for automated identification of seabed pockmarks.": 1-9 (Year: 2014).*

Rodngueza, R., et al. "Journal of Applied Research and Technology." Journal of Applied Research and Technology 13 (2015): 261-269. (Year: 2015).*

Weerakoon, Tharindu, Kazuo Ishii, and Amir Ali Forough Nassiraei. "Geometric feature extraction from 2D laser range data for mobile robot navigation." 2015 IEEE 10th International Conference on Industrial and Information Systems (ICIIS). IEEE, 2015: 326-331 (Year: 2015).*

Rebbapragada, Umaa, et al. "Finding anomalous periodic time series." Machine learning 74.3 (2009): 281-313. (Year: 2009).*

* cited by examiner

US 11,276,004 B2

METHOD AND APPARATUS FOR MONITORING SYSTEM

CROSS REFERENCE TO RELATED APPLICATION

This application claims the priority of Chinese Patent Application No. 201610814685.2, entitled "METHOD AND APPARATUS FOR MONITORING SYSTEM," filed on Sep. 9, 2016, the content of which is incorporated herein by reference in its entirety.

TECHNICAL FIELD

The present application relates to the field of computer technology, specifically to the field of Internet technology, and more specifically to a method and system for monitoring a system.

BACKGROUND

In recent years, more and more attention has been paid to time series data forecasting and feature extraction. Domestic and international Internet companies all begin to utilize feature extraction technology to monitor their operation and maintenance and to monitor related time series data, so as to immediately detect abnormal events and thus reduce the loss when the abnormal events occur.

However, the existing time series data forecasting and feature extraction techniques are mainly performed based on human attention and manual set of feature extraction algorithms and the value ranges of feature values. When data changes, the feature extraction algorithm and the value range of feature values need to be adjusted manually in time. Thus, there is a problem of high maintenance costs and dependence on personal experience of the maintenance personnel.

SUMMARY

An objective of the present application is to provide an improved method and apparatus for monitoring a system, in order to solve the technical problem mentioned in the Background section.

In a first aspect, the present application provides a method for monitoring a system comprising: acquiring status index data series of a monitored system during at least one data collection period, as historical status index data series; introducing the historical status index data series into a pre-trained recommended feature extraction model to perform a matching operation, to obtain a feature extraction algorithm matched with the historical status index data series as a recommended feature extraction algorithm, wherein the recommended feature extraction model characterizes a corresponding relationship between the status index data series and the obtained feature extraction algorithm; determining a maximum value and a minimum value of feature values obtained by performing feature extraction on the historical status index data series according to the recommended feature extraction algorithm; determining, based on the determined maximum value and minimum value, a normal value range of feature values obtained by performing feature extraction on status index data series of the monitored system according to the recommended feature extraction algorithm; and monitoring the monitored system according to the recommended feature extraction algorithm and the normal value range.

In a second aspect, the present application provides an apparatus for monitoring a system comprising: an acquisition unit, configured to acquire status index data series, of a monitored system during at least one data collection period, as historical status index data series; a matching unit, configured to introduce the historical status index data series into a pre-trained recommended feature extraction model to perform a matching operation, to obtain a feature extraction algorithm matched with the historical status index data series as a recommended feature extraction algorithm, wherein the recommended feature extraction model characterizes a corresponding relationship between the status index data series and the obtained feature extraction algorithm; a first determination unit, configured to determine a maximum value and a minimum value of feature values obtained by performing feature extraction on the historical status index data series according to the recommended feature extraction algorithm; a second determination unit, configured to determine, based on the determined maximum value and minimum value, a normal value range of feature values obtained by performing feature extraction on status index data series of the monitored system according to the recommended feature extraction algorithm; and a monitoring unit, configured to monitor the monitored system according to the recommended feature extraction algorithm and the normal value range.

By acquiring status index data series of a monitored system during at least one data collection period, as historical status index data series, introducing the historical status index data series into a pre-trained recommended feature extraction model to perform a matching operation, to obtain a feature extraction algorithm matched with the historical status index data series as a recommended feature extraction algorithm, determining a maximum value and a minimum value of feature values obtained by performing feature extraction on the historical status index data series according to the recommended feature extraction algorithm, determining, based on the determined maximum value and minimum value, a normal value range of feature values obtained by performing feature extraction on status index data series of the monitored system according to the recommended feature extraction algorithm, and monitoring the monitored system according to the recommended feature extraction algorithm and the normal value range, the method and apparatus for monitoring a system provided by the present application make efficient use of historical status index data series of the monitored system, reduce operation and maintenance costs of monitoring system and improve accuracy of monitoring system.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
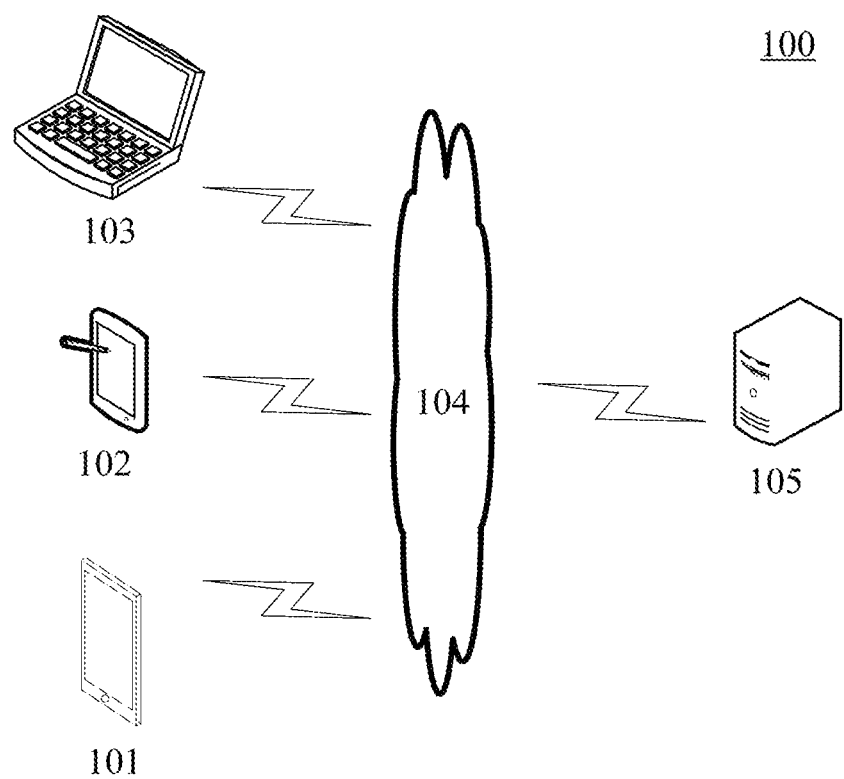
FIG. 1 is an architectural diagram of an exemplary system in which the present application may be implemented.

FIG. 1 shows an exemplary architecture of a system 100 which may be used by a system monitoring method or a system monitoring apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, shopping applications, search applications, instant messaging tools, mailbox clients, social platform software, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server providing data support to the applications running on the terminal devices 101, 102 or 103, a server conducting statistics on the user uploaded and published blogs, or a server collecting log data generated by the backend server during the operation.

It should be noted that the system monitoring method according to the embodiments of the present application is generally executed by the server 105, and accordingly, a system monitoring apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
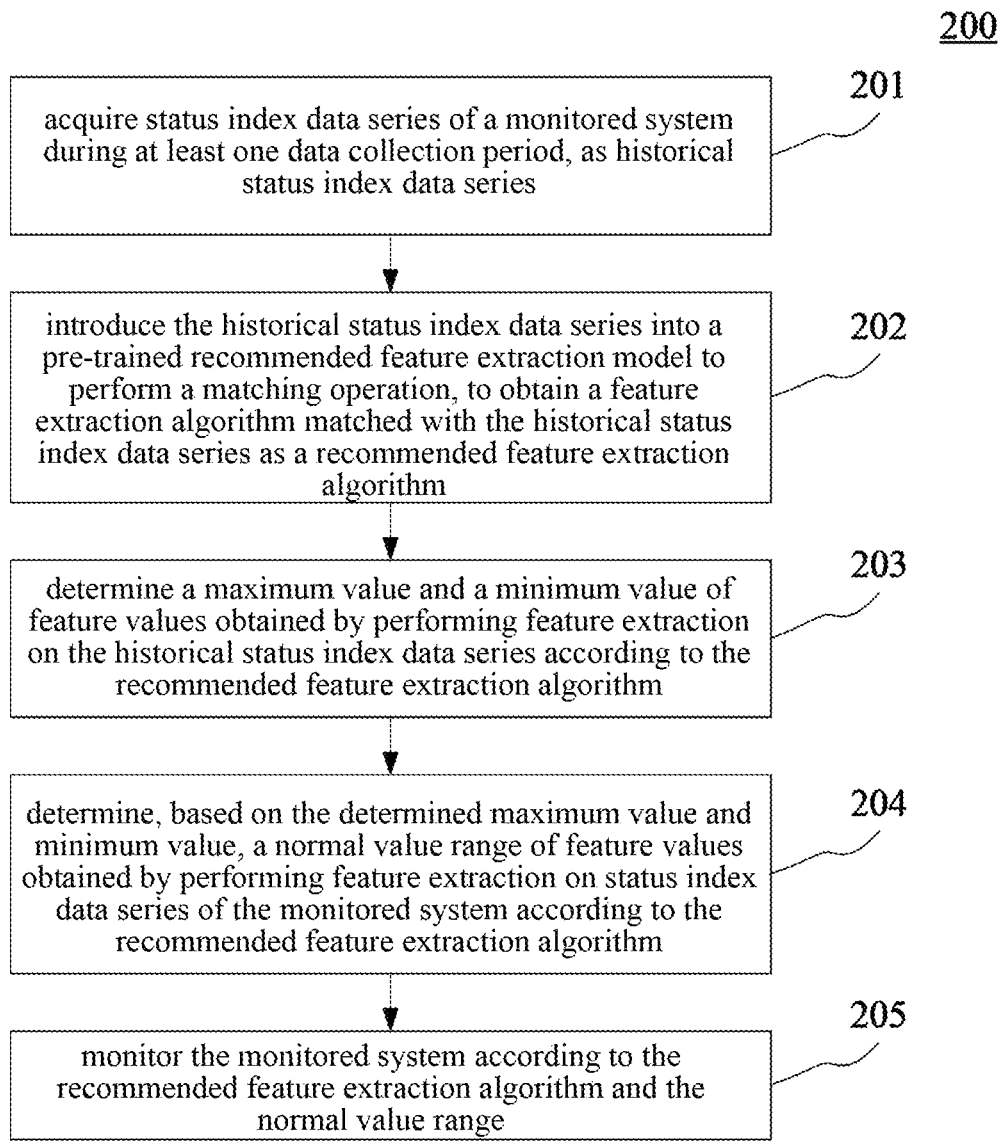
FIG. 2 is a flowchart of a method for monitoring a system according to an embodiment of the present application.

With further reference to FIG. 2, a flow 200 of a method for monitoring a system according to an embodiment of the present application is illustrated. The method for monitoring a system includes the following steps.

Step 201, acquire status index data series of a monitored system during at least one data collection period, as historical status index data series.

In this embodiment, an electronic device (e.g., the server as illustrated in FIG. 1) on which the system monitoring method operates may acquire, by means of wired connection or wireless connection, status index data series of a monitored system during at least one data collection period, as historical status index data series. A status index data series is data that reflects a status index of a certain aspect of the monitored system at different points in time/time periods. For example, status index data may be a number of search engine responses to user clicks, or a number of messages uploaded or published by users and received by websites such as TIEBA (communication platform) or WEIBO (social network site), or log data generated during the operation of a server and etc. Different monitored systems have different data collection periods. For example, data collection period may be one week or one day. Due to the different natures of different monitored systems, data collection frequencies are also different. That is, in every data collection period, at least one data collection time is included, and data is collected at each data collection time. For example, if data collection period is one week, data collection frequency may be 7 (i.e., collecting data 7 times in every data collection period), and the corresponding data collection time may be at the same time point every day, such as collect once at 12:00 at noon every day; if data collection period is one day, data collection frequency may be 24 (i.e., collecting data 24 times in every data collection period), and the corresponding data collection time may be at the same time point every hour, such as collect once every hour on the hour, i.e., collect once at 1 o'clock, collect once at 2 o'clock, collect once at 3 o'clock, . . . , collect once at 23 o'clock and collect once at 24 o'clock.

In some optional implementations of this embodiment, the electronic device may select a predetermined number of status index data from collected status index data series of the monitored system according to data collection time in a new to old order as historical status index data series.

Step 202, introduce the historical status index data series into a pre-trained recommended feature extraction model to perform a matching operation, to obtain a feature extraction algorithm matched with the historical status index data series as a recommended feature extraction algorithm.

In this embodiment, after the electronic device obtains the historical status index data series, the historical status index data series are introduced into a pre-trained recommended feature extraction model to perform a matching operation. The recommended feature extraction model finds out a feature extraction algorithm matched with the historical status index data series as the recommended feature extraction algorithm according to the pre-trained corresponding relationship. Here, the recommended feature extraction model characterizes a corresponding relationship between the status index data series and the obtained feature extraction algorithm.

In some optional implementations of this embodiment, the electronic device may first introduce the historical status index data series into the recommended feature extraction model to obtain feature extraction algorithms containing a matching degree, wherein the matching degree is used to represent the accuracy of determining feature extraction algorithms based on the historical status index data series, and a feature extraction algorithm with a highest matching degree is defined as the recommended feature extraction algorithm. The matching degree may be numerical values in various forms, such as a numerical value in the form of a percentage, or a numerical value in the form of a decimal between 0 and 1, as well as numerical values in other various forms.

Step 203, determine a maximum value and a minimum value of feature values obtained by performing feature extraction on the historical status index data series according to the recommended feature extraction algorithm.

In this embodiment, after the recommended feature extraction algorithm is determined in step 202, the electronic device may determine a maximum value and a minimum value of feature values obtained by performing feature extraction on the historical status index data series acquired in step 201 according to the recommended feature extraction algorithm determined in step 202.

In some optional implementations of this embodiment, the electronic device may first perform feature extraction on the historical status index data series acquired in step 201 according to the recommended feature extraction algorithm determined in step 202 to obtain feature values; then, define the maximum value and minimum value of the obtained feature values respectively as the maximum value and the minimum value of feature values obtained by performing feature extraction on the historical status index data series according to the recommended feature extraction algorithm.

Step 204, determine, based on the determined maximum value and minimum value, a normal value range of feature values obtained by performing feature extraction on status index data series of the monitored system according to the recommended feature extraction algorithm.

In this embodiment, after the maximum value and the minimum value of feature values obtained by performing feature extraction on the historical status index data series according to the recommended feature extraction algorithm are determined, the electronic device may adopt various methods to determine, based on the determined maximum value and minimum value, a normal value range of feature values obtained by performing feature extraction on status index data series of the monitored system according to the recommended feature extraction algorithm.

In some optional implementations of this embodiment, the electronic device may directly define the determined maximum value and minimum value respectively as the maximum value and minimum value corresponding to the normal value range of feature values obtained by performing feature extraction on the status index data series of the monitored system according to the recommended feature extraction algorithm.

Step 205, monitor the monitored system according to the recommended feature extraction algorithm and the normal value range.

In this embodiment, after the recommended feature extraction algorithm and the normal value range of feature values obtained by performing feature extraction on status index data series of the monitored system according to the recommended feature extraction algorithm are determined, the electronic device may monitor the monitored system according to the recommended feature extraction algorithm and the normal value range.

In some optional implementations of this embodiment, the step may be implemented as follow: firstly, collect periodically the status index data of the monitored system and generate status index data series as monitored status index data series; then, perform feature extraction on the monitored status index data series according to the recommended feature extraction algorithm to obtain feature values of the monitored status index data series; lastly, determine that the monitored system is abnormal, if the feature values of the monitored status index data series are not within the normal value range, and determine that the monitored system is normal, if the feature values of the monitored status index data series are within the normal value range.

In some optional implementations of this embodiment, the method may further comprises a step for building feature extraction recommended model, the step for building recommended feature extraction model may include: obtaining the recommended feature extraction model through training by using a machine learning method, based on manually labelled status index data series of the monitored system and a feature extraction algorithm corresponding to status index data series of the monitored system. Here, the machine learning method may include but is not limited to: a decision tree model, an artificial neural network, a support vector machine, and the like. It should be noted that the above-described various machine learning methods are well-known techniques which have been extensively studied and applied, and will not be further described here.

Figure 3:
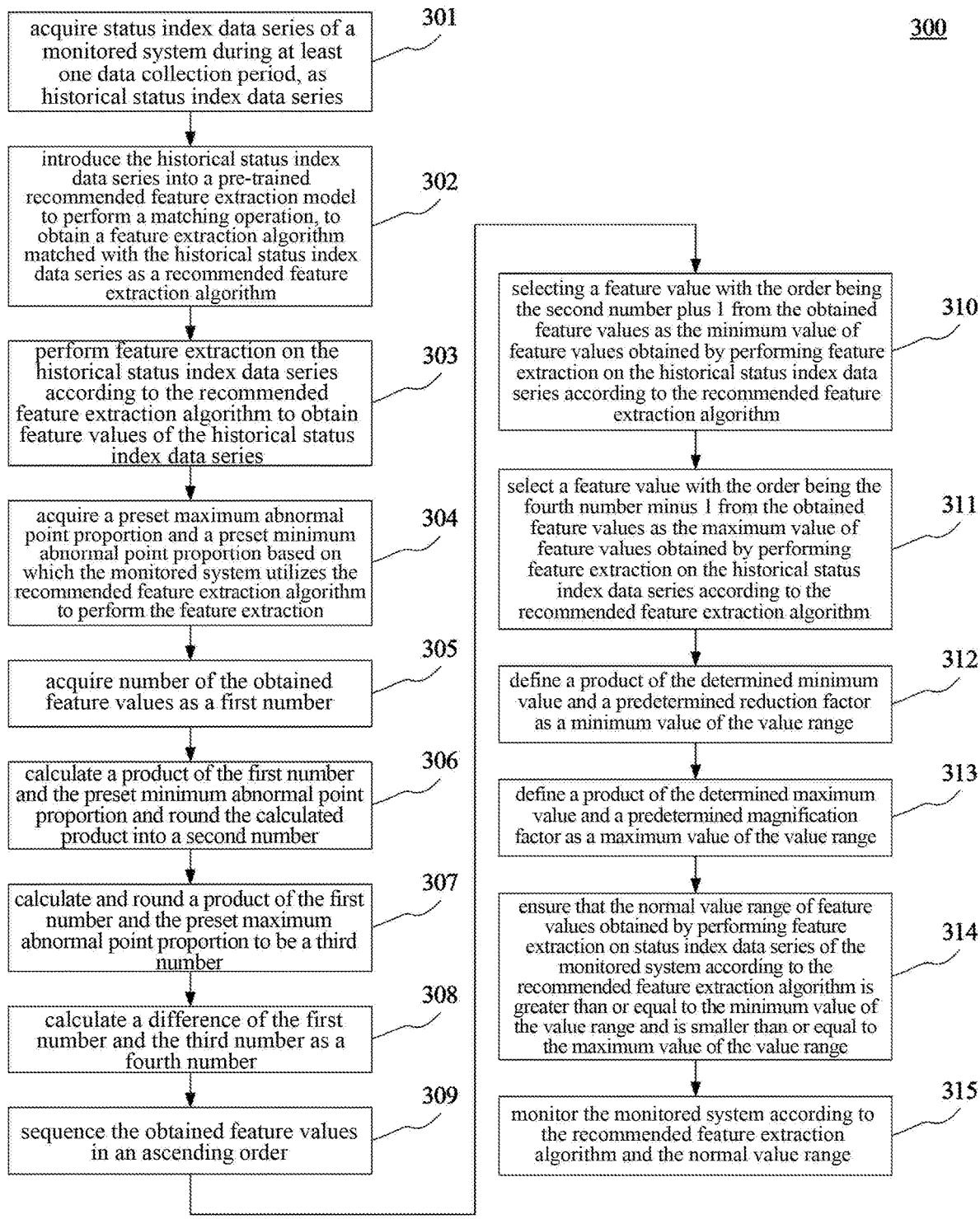
FIG. 3 is a flowchart of the method for monitoring a system according to another embodiment of the present application.

With further reference to FIG. 3, a flow 300 of the system monitoring method according to another embodiment is illustrated. The flow 300 of the system monitoring method includes the following steps:

Step 301, acquire status index data series of a monitored system during at least one data collection period, as historical status index data series.

Step 302, introduce the historical status index data series into a pre-trained recommended feature extraction model to perform a matching operation, to obtain a feature extraction algorithm matched with the historical status index data series as a recommended feature extraction algorithm.

Operation of the steps 301-302 are substantially the same as operation of the steps 201-202 in embodiment illustrated by FIG. 2, thus detailed descriptions thereof are not repeated.

Step 303, perform feature extraction on the historical status index data series according to the recommended feature extraction algorithm to obtain feature values of the historical status index data series.

In this embodiment, different recommended feature extraction algorithms have different feature values. For different recommended feature extraction algorithms, the calculation methods of feature values are different.

In some optional implementations of this embodiment, the recommended feature extraction algorithm may be a period-over-period feature extraction algorithm. Performing feature extraction on the historical status index data series according to the period-over-period feature extraction algorithm to obtain feature values of the historical status index data series may include: firstly, calculating from the second data collection period in the historical status index data series a ratio of status index data of each data collection period to status index data of the previous collection period of the collection period; then, defining the calculated ratios as feature values obtained by performing feature extraction on the historical status index data series according to the period-over-period feature extraction algorithm.

For example, taking a website as the monitored system, the status index is hits on the website, the data collection period is one day, the data collection frequency is 24, i.e., collecting data per hour, the data collection time is every hour on the hour, i.e., collecting hits from 0:00 am to 1:00 am at 1:00 am, collecting hits from 1:00 am to 2:00 am at 2:00 am, . . . , collecting hits from 11:00 am to 12:00 pm at 12:00 pm, . . . , collecting hits from 11:00 pm to 12:00 am at 12:00 am (i.e., 0:00 am). Here, if what is acquired is historical status index data series of 7 collection period (i.e., 7 days), then the obtained is historical status index data series of 7*27 hits. Performing feature extraction on the historical status index data series according to the period-over-period feature extraction algorithm may include: calculating from the second day a ratio of total hits of 24 data collection time every day to total hits of 24 data collection time of the previous day, to obtain 6 ratios, and defining the 6 ratios as 6 feature values. Performing feature extraction on the historical status index data series according to the period-over-period feature extraction algorithm may further include: classifying every day data collection time into busy hours (for example, every hour on the hour from 9:00 am to 10:00 pm is busy hour data collection time) and idle hours (for example, every hour on the hour from 11:00 pm to 8:00 am is idle hour data collection time), calculating from the second day a ratio of the sum of total hits of busy hours every day to the sum of total hits of busy hours of the previous day, to obtain 6 busy hour ratios, and defining the 6 busy hour ratios as 6 feature values corresponding to the busy hours, and calculating from the second day a ratio of sum of total hits of idle hours every day to sum of total hits of idle hours of the previous day, to obtain 6 idle hour ratios, and defining the 6 busy hour ratios as 6 feature values corresponding to the idle hours. The period-over-period feature extraction algorithm is suitable for situations where status index data of the monitored system has obvious periodic features.

In some optional implementations of this embodiment, the recommended feature extraction algorithm may also be a chain relative feature extraction algorithm. Performing feature extraction on the historical status index data series according to the chain relative feature extraction algorithm may include: firstly, calculating from the second data collection time in the historical status index data series a ratio of status index data of each data collection time to status index data of the previous collection time; then, defining the calculated ratios as feature values obtained by performing feature extraction on the historical status index data series according to the chain relative feature extraction algorithm.

In some optional implementations of this embodiment, the recommended feature extraction algorithm may also be a chain relative feature extraction algorithm. Performing feature extraction on the historical status index data series according to the chain relative feature extraction algorithm may include: firstly, calculating from the second data collection time in the historical status index data series a ratio of status index data of each data collection time to status index data of the previous collection time; then, defining the calculated ratios as feature values obtained by performing feature extraction on the historical status index data series according to the chain relative feature extraction algorithm.

For example, taking a website as the monitored system, the status index is hits on the website, the data collection period is one day, the data collection frequency is 24, i.e., collecting data per hour, the data collection time is every hour on the hour, i.e., collecting hits from 0:00 am to 1:00 am at 1:00 am, collecting hits from 1:00 am to 2:00 am at 2:00 am, . . . , collecting hits from 11:00 am to 12:00 am at 12:00 am, . . . , collecting hits from 11:00 pm to 12:00 pm at 12:00 pm (i.e, 0:00 am). Here, if what is acquired is historical status index data series of 3 collection period (i.e., 3 days), then the obtained is historical status index data series of 3*24 hits. Performing feature extraction on the historical status index data series according to the chain relative feature extraction algorithm may include: calculating a ratio of hits of each collection time in 24 data collection time everyday to hits of the previous collection time, to obtain (3*24−1) ratios, and defining the (3*24−1) ratios as (3*24−1) feature values. The chain relative feature extraction algorithm is suitable for where status index data series of the monitored system does not have obvious periodic features.

In some optional implementations of this embodiment, the recommended feature extraction algorithm may also be a constant threshold feature extraction algorithm. Performing feature extraction on the historical status index data series according to the constant threshold feature extraction algorithm may include: defining every status index data of the historical status index data series as feature values obtained by performing feature extraction on the status index data series according to the constant threshold feature extraction algorithm.

For example, taking a website as the monitored system, the status index is hits on the website, the data collection period is one day, the data collection frequency is 24, i.e., collecting data per hour, the data collection time is every hour on the hour, i.e., collecting hits from 0:00 am to 1:00 am at 1:00 am, collecting hits from 1:00 am to 2:00 am at 2:00 am, . . . , collecting hits from 11:00 am to 12:00 am at 12:00 am, . . . , collecting hits from 11:00 pm to 12:00 pm at 12:00 pm (i.e, 0:00 am). Here, if what is acquired is historical status index data series of 2 collection period (i.e., 2 days), then the obtained is status index data series of 2*24 hits. Define the data of 2*24 hits directly as 2*24 feature values.

Step 304, acquire a preset maximum abnormal point proportion and a preset minimum abnormal point proportion based on which the monitored system utilizes the recommended feature extraction algorithm to perform the feature extraction.

In this embodiment, the preset maximum abnormal point proportion and the preset minimum abnormal point proportion are both numerical values greater than or equal to 0 and smaller than 1. The preset maximum abnormal point proportion indicates that based on historical experience: in feature values obtained by performing feature extraction on status index data series of the monitored system according to the recommended feature extraction algorithm, feature values in a descending order with preset maximum abnormal point proportion are abnormal and needs to be discarded. The preset minimum abnormal point proportion indicates that based on historical experience: in feature values obtained by performing feature extraction on status index data series of the monitored system according to the recommended feature extraction algorithm, feature values in an ascending order with preset minimum abnormal point proportion are abnormal and needs to be discarded. Here, the preset maximum abnormal point proportion and the preset minimum abnormal point proportion may be preset by operation and maintenance personnel of the monitored system according to their experience.

Step 305, acquire number of the obtained feature values as a first number.

In this embodiment, the electronic device may acquire number of the feature values of the historical status index data series obtained in step 303 as a first number.

Step 306, calculate a product of the first number and the preset minimum abnormal point proportion and rounding the calculated product into a second number.

In this embodiment, the second number may be defined by calculating a product of the first number and the preset minimum abnormal point proportion and rounding the calculated product. Here, the second number indicates the number of to-be-discarded abnormal feature values in ascending order in feature values of the historical status index data series.

Step 307, calculate and rounding a product of the first number and the preset maximum abnormal point proportion to be a third number.

In this embodiment, the third number may be defined by calculating and rounding a product of the first number and the preset maximum abnormal point proportion. Here, the third number indicates the number of to-be-discarded abnormal feature values in a descending order in feature values of the historical status index data series.

Step 308, calculate a difference of the first number and the third number as a fourth number.

In this embodiment, the fourth number may be defined by calculating a difference of the first number and the third number.

Step 309, sequence the obtained feature values in an ascending order.

In this embodiment, the feature values of the historical status index data series obtained in step 303 may be sequenced in an ascending order.

Step 310, select a feature value with the order being the second number plus 1 from the obtained feature values as the minimum value of feature values obtained by performing feature extraction on the historical status index data series according to the recommended feature extraction algorithm.

In this embodiment, after ordering the feature values obtained in an ascending order in step 309, a feature value with the order being the second number plus 1 from the obtained feature values may be selected as the minimum value of feature values obtained by performing feature extraction on the historical status index data series according to the recommended feature extraction algorithm, since feature values with the order being smaller than or equal to the second number are abnormal feature values.

Step 311, select a feature value with the order being the fourth number minus 1 from the obtained feature values as the maximum value of feature values obtained by performing feature extraction on the historical status index data series according to the recommended feature extraction algorithm.

In this embodiment, a feature value with the order being the fourth number minus 1 from the obtained feature values may be selected as the maximum value of feature values obtained by performing feature extraction on the historical status index data series according to the recommended feature extraction algorithm, since feature values with the order being greater than or equal to the fourth number are abnormal feature values.

Step 312, define a product of the determined minimum value and a predetermined reduction factor as a minimum value of the value range.

In this embodiment, a product of the determined minimum value in step 310 and a predetermined reduction factor may be defined as the minimum value of the value range. Here, the predetermined reduction factor is a numerical value greater than 0 and smaller than 1. The predetermined reduction factor may be preset by operation and maintenance personnel of the monitored system according to their experience.

Step 313, define a product of the determined maximum value and a predetermined magnification factor as a maximum value of the value range.

In this embodiment, a product of the determined maximum value in step 311 and a predetermined magnification factor may be defined as the maximum value of the value range. Here, the predetermined magnification factor is a numerical value greater than 1. The predetermined magnification factor may be preset by operation and maintenance personnel of the monitored system according to their experience.

Step 314, ensure that the normal value range of feature values obtained by performing feature extraction on status index data series of the monitored system according to the recommended feature extraction algorithm is greater than or equal to the minimum value of the value range and is smaller than or equal to the maximum value of the value range.

In this embodiment, the normal value range of feature values obtained by performing feature extraction on status index data series of the monitored system according to the recommended feature extraction algorithm may be ensured to be greater than or equal to the minimum value of the value range obtained in step 312 and smaller than or equal to the maximum value of the value range defined in step 313.

Step 315, monitor the monitored system according to the recommended feature extraction algorithm and the normal value range.

In this embodiment, operation of the step 315 is substantially the same as operation of the step 205 in embodiment illustrated by FIG. 2, thus detailed descriptions thereof are not repeated.

As shown in FIG. 3, compared with the embodiment corresponding to FIG. 2, the flow 300 of the system monitoring method in this embodiment highlights the steps 303-311 of determining the maximum value and the minimum value of feature values obtained by performing feature extraction on the historical status index data series according to the recommended feature extraction algorithm and the steps 312-314 of determining the normal value range of feature values obtained by performing feature extraction on the status index data series of the monitored system according to the recommended feature extraction algorithm. Thus, the solution described by this embodiment can discard abnormal feature values of feature values obtained by performing feature extraction on the historical status index data series according to the recommended feature extraction algorithm, broaden the normal value range of feature values obtained by performing feature extraction on the status index data series of the monitored system according to the recommended feature extraction algorithm, and thus improve the monitoring accuracy of the monitored system.

Figure 4:
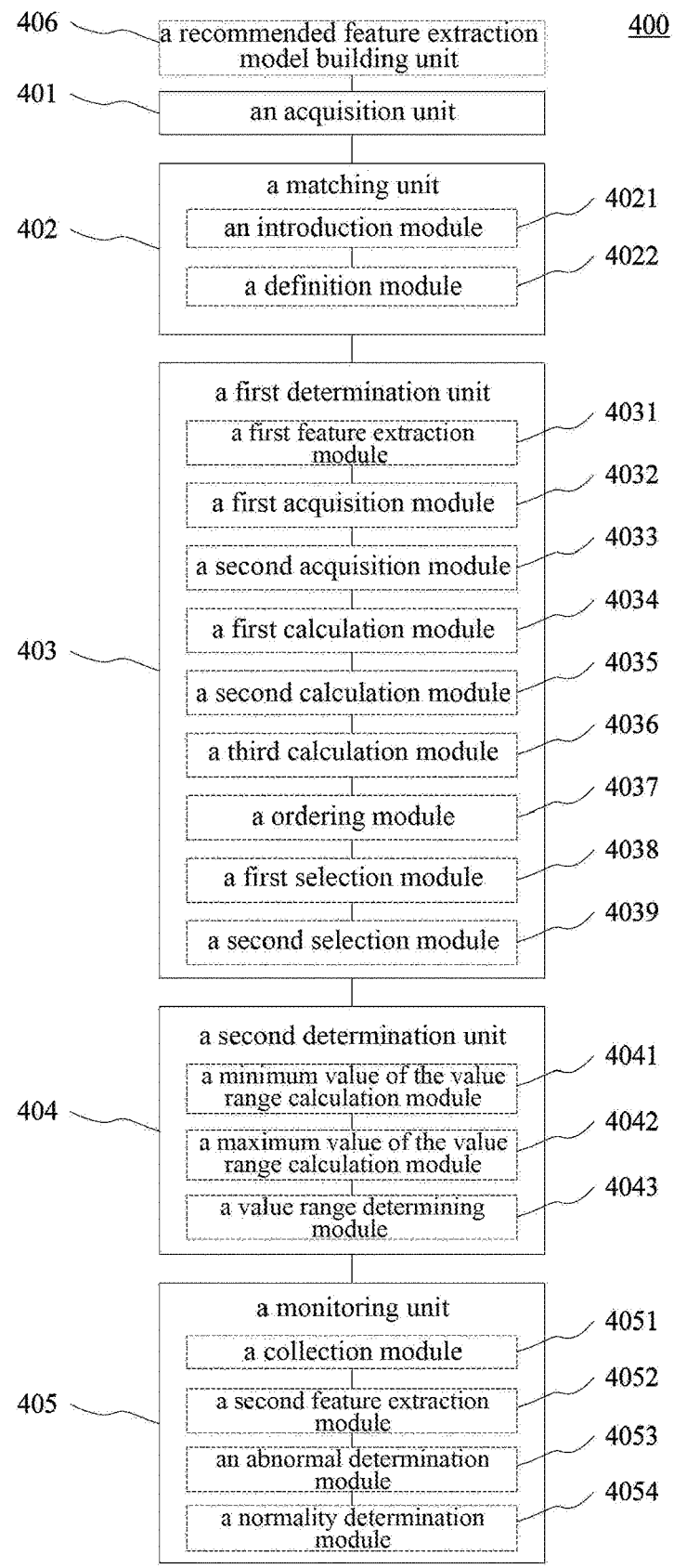
FIG. 4 is a schematic structural diagram of an apparatus for monitoring a system monitoring apparatus according to an embodiment of the present application.

With further reference to FIG. 4, as an implementation to the method shown in the above-mentioned figures, the present application provides an embodiment of an apparatus for monitoring a system. This apparatus embodiment corresponds to the method embodiment shown in FIG. 2. The apparatus may be specifically applied to various electronic devices.

As shown in FIG. 4, the system monitoring apparatus 400 according to this embodiment includes: an acquisition unit 401, a matching unit 402, a first determination unit 403, a second determination unit 404 and a monitoring unit 405. The acquisition unit 401 is configured to acquire status index data series, of a monitored system during at least one data collection period, as historical status index data series. The matching unit 402 is configured to introduce the historical status index data series into a pre-trained recommended feature extraction model to perform a matching operation, to obtain a feature extraction algorithm matched with the historical status index data series as a recommended feature extraction algorithm, wherein the recommended feature extraction model characterizes a corresponding relationship between the status index data series and the obtained feature extraction algorithm. The first determination unit 403 is configured to determine a maximum value and a minimum value of feature values obtained by performing feature extraction on the historical status index data series according to the recommended feature extraction algorithm. The second determination unit 404 is configured to determine, based on the determined maximum value and minimum value, a normal value range of feature values obtained by performing feature extraction on status index data series of the monitored system according to the recommended feature extraction algorithm. The monitoring unit 505 is configured to monitor the monitored system according to the recommended feature extraction algorithm and the normal value range.

In this embodiment, the specific process of the acquisition unit 401, the matching unit 402, the first determination unit 403, the second determination unit 404 and the monitoring unit 405 of the system monitoring apparatus 400 and the technical effects thereof can be referred to respectively in the descriptions of the step 201, the step 202, the step 203, the step 204 and the step 205 in the corresponding embodiment of FIG. 2, thus detailed descriptions thereof is not repeated.

In some optional implementations of this embodiment, the system monitoring apparatus 400 may further include: a recommended feature extraction model building unit 406, configured to obtain the recommended feature extraction model through training by using a machine learning method, based on manually labeled status index data series of the monitored system and a feature extraction algorithm corresponding to status index data series of the monitored system.

In some optional implementations of this embodiment, the matching unit 402 may include: an introduction module 4021, configured to introduce the historical status index data series into the recommended feature extraction model to obtain feature extraction algorithms containing a matching degree used to represent the accuracy of determining feature extraction algorithms based on the historical status index data series; and a definition module 4022, configured to define a feature extraction algorithm with a highest matching degree as the recommended feature extraction algorithm.

In some optional implementations of this embodiment, the first determination unit 403 may include: a first feature extraction module 4031, configured to perform feature extraction on the historical status index data series according to the recommended feature extraction algorithm to obtain feature values of the historical status index data series; a first acquisition module 4032, configured to acquire a preset maximum abnormal point proportion and a preset minimum abnormal point proportion based on which the monitored system utilizes the recommended feature extraction algorithm to perform the feature extraction, the preset maximum abnormal point proportion and the preset minimum abnormal point proportion being numerical values greater than or equal to 0 and smaller than 1; a second acquisition module 4033, configured to acquire number of the obtained feature values as a first number; a first calculation module 4034, configured to calculate a product of the first number and the preset minimum abnormal point proportion and rounding the calculated product into a second number; a second calculation module 4035, configured to calculate and rounding a product of the first number and the preset maximum abnormal point proportion to be a third number; a third calculation module 4036, configured to calculate a difference of the first number and the third number as a fourth number; a ordering module 4037, configured to sequence the obtained feature values in an ascending order; a first selection module 4038, configured to select, from the obtained feature values, a feature value with the order being the second number plus 1 as the minimum value of feature values obtained by performing feature extraction on the historical status index data series according to the recommended feature extraction algorithm; and a second selection module 4039, configured to select, from the obtained feature values, a feature value with the order being the fourth number minus 1 as the maximum value of feature values obtained by performing feature extraction on the historical status index data series according to the recommended feature extraction algorithm.

In some optional implementations of this embodiment, the second determination unit 404 may include: a minimum value of the value range calculation module 4041, configured to define a product of the determined minimum value and a predetermined reduction factor as a minimum value of the value range, the predetermined reduction factor being a numerical value greater than 0 and smaller than 1; a maximum value of the value range calculation module 4042, configured to define a product of the determined maximum value and a predetermined magnification factor as a maximum value of the value range, the predetermined magnification factor being a numerical value greater than 1; and a value range determining module 4043, configured to ensure that the normal value range of feature values obtained by performing feature extraction on status index data series of the monitored system according to the recommended feature extraction algorithm is greater than or equal to the minimum value of the value range and is smaller than or equal to the maximum value of the value range.

In some optional implementations of this embodiment, the monitoring unit 405 may include: a collection module 4051, configured to collect periodically the status index data of the monitored system and generate status index data series as monitored status index data series; a second feature extraction module 4052, configured to perform feature extraction on the monitored status index data series according to the recommended feature extraction algorithm to obtain feature values of the monitored status index data series; and an abnormal determination module 4053, configured to determine that the monitored system is abnormal, if the feature values of the monitored status index data series are not within the normal value range.

In some optional implementations of this embodiment, the monitoring unit 405 may further include: a normality determination module 4054, configured to determine that the monitored system is normal, if the feature values of the monitored status index data series are within the normal value range.

Figure 5:
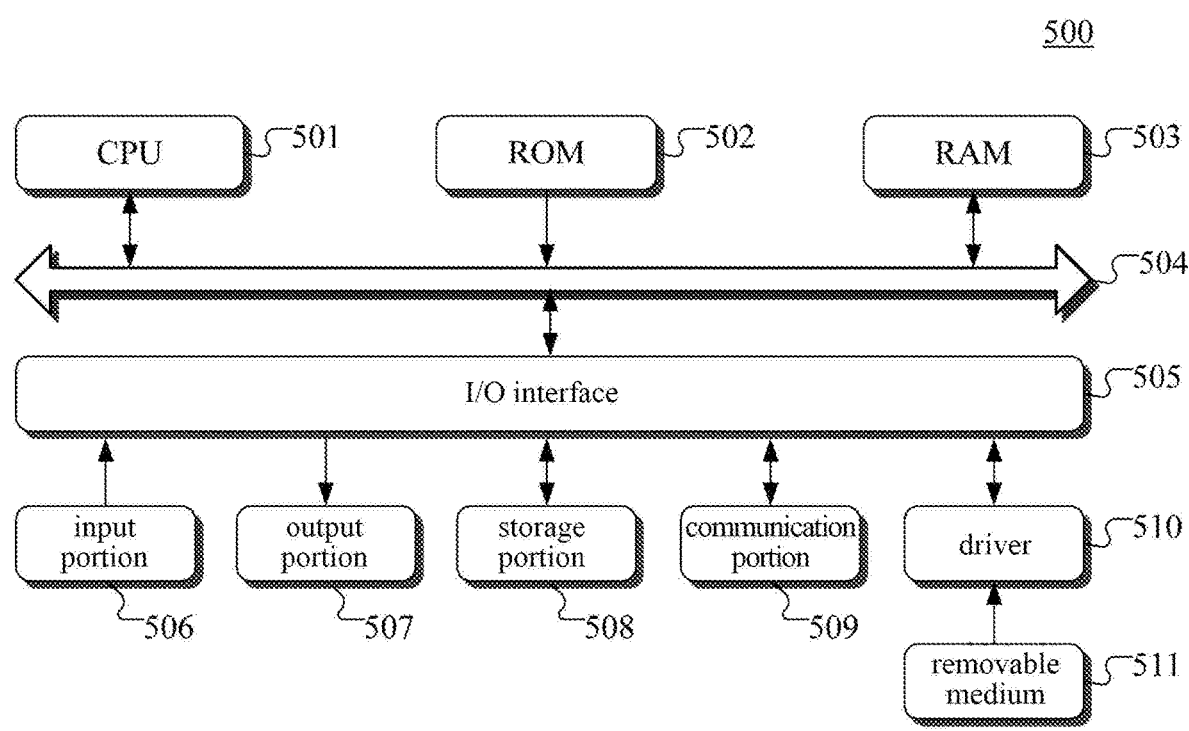
FIG. 5 is a schematic structural diagram of a computer system adapted to implement a server of the embodiments of the present application.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like;

and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an acquisition unit, a matching unit, a first determination unit, a second determination unit and a monitoring unit, where the names of these units are not considered as a limitation to the units. For example, the acquisition unit may also be described as "a unit for acquiring status index data series."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire status index data series of a monitored system during at least one data collection period, as historical status index data series; introduce the historical status index data series into a pre-trained recommended feature extraction model to perform a matching operation, and obtain a feature extraction algorithm matched with the historical status index data series as a recommended feature extraction algorithm, wherein the recommended feature extraction model characterizes a corresponding relationship between the status index data series and the obtained feature extraction algorithm; determine a maximum value and a minimum value of feature values obtained by performing feature extraction on the historical status index data series according to the recommended feature extraction algorithm; determine, based on the determined maximum value and minimum value, a normal value range of feature values obtained by performing feature extraction on the status index data series of the monitored system according to the recommended feature extraction algorithm; and monitor the monitored system according to the recommended feature extraction algorithm and the normal value range.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for monitoring a system, comprising:
   acquiring a series of status index data of a monitored system during at least one data collection period, as a series of historical status index data;
   obtaining a feature extraction algorithm matching the series of historical status index data by: introducing the series of historical status index data into a pre-trained recommended feature extraction model to match the series of historical status index data to the feature extraction algorithm according to a pre-trained corresponding relationship between the series of historical status index data and the obtained feature extraction algorithm, the obtained feature extraction algorithm being a recommended feature extraction algorithm, wherein the corresponding relationship between the series of historical status index data and the obtained feature extraction algorithm is characterized by the recommended feature extraction model;
   determining a maximum value and a minimum value of feature values obtained by performing feature extraction on the series of historical status index data according to the recommended feature extraction algorithm, wherein the recommended feature extraction algorithm comprises a period-over-period feature extraction algorithm, or a chain relative feature extraction algorithm, and different recommended feature extraction algorithms correspond to different feature values;
   determining, based on the determined maximum value and minimum value, a normal value range of feature values obtained by performing feature extraction on the series of historical status index data of the monitored system according to the recommended feature extraction algorithm, wherein performing feature extraction on the series of historical status index data of the monitored system according to the recommended feature extraction algorithm comprises: calculating, from a second data collection period in the series of historical status index data, a ratio of historical status index data of each data collection period to historical status index data of a previous collection period of the collection period; and defining the calculated ratio as feature values obtained by performing feature extraction on the series of historical status index data according to the period-over-period feature extraction algorithm or the chain relative feature extraction algorithm; and monitoring the monitored system according to the recommended feature extraction algorithm and the normal value range.

2. The method according to claim 1, the method further comprising building the recommended feature extraction model, the building the recommended feature extraction model comprising:

obtaining the recommended feature extraction model through training by using a machine learning method, based on a manually labeled series of historical status index data of the monitored system and the feature extraction algorithm corresponding to the series of historical status index data of the monitored system.

3. The method according to claim 1, wherein the obtaining a feature extraction algorithm matching the series of historical status index data by introducing the series of historical status index data into a pre-trained recommended feature extraction model to match the series of historical status index data to the feature extraction algorithm according to a pre-trained corresponding relationship between the series of historical status index data and the feature extraction algorithm, the feature extraction algorithm being a recommended feature extraction algorithm comprises:

introducing the historical status index data series into the recommended feature extraction model to obtain feature extraction algorithms with a matching degree used to represent an accuracy of determining feature extraction algorithms based on the series of historical status index data; and defining a feature extraction algorithm of the obtained feature extraction algorithms with a highest matching degree as the recommended feature extraction algorithm.

4. The method according to claim 1, wherein the determining a maximum value and a minimum value of feature values obtained by performing feature extraction on the series of historical status index data according to the recommended feature extraction algorithm comprises:

performing feature extraction on the series of historical status index data according to the recommended feature extraction algorithm to obtain feature values of the series of historical status index data;

acquiring a preset maximum abnormal point proportion and a preset minimum abnormal point proportion based on which the monitored system utilizes the recommended feature extraction algorithm to perform the feature extraction, the preset maximum abnormal point proportion and the preset minimum abnormal point proportion being numerical values greater than or equal to 0 and smaller than 1;

acquiring a number of the obtained feature values as a first number;

calculating a first product of the first number and the preset minimum abnormal point proportion and rounding the calculated first product into a second number, the second number being the rounded first product;

calculating and rounding a second product of the first number and the preset maximum abnormal point proportion to be a third number, the third number being the rounded second product;

calculating a difference between the first number and the third number as a fourth number;

ordering the obtained feature values in an ascending order;

selecting, from the obtained feature values, an $i^{th}$ feature value in the ascending order as the minimum value of eigenvalues obtained by performing feature extraction on the series of historical status index data according to the recommended feature extraction algorithm, i being a sum of the second number and 1; and selecting, from the obtained feature values, a $j^{th}$ feature value in the ascending order as the maximum value of feature values obtained by performing feature extraction on the series of historical status index data according to the recommended feature extraction algorithm, j being a difference between the fourth number and 1.

5. The method according to claim 1, wherein the determining, based on the determined maximum value and minimum value, a normal value range of feature values obtained by performing feature extraction on the series of historical status index data of the monitored system according to the recommended feature extraction algorithm comprises:

defining a product of the determined minimum value and a predetermined reduction factor as a minimum value of the value range, the predetermined reduction factor being a numerical value greater than 0 and smaller than 1;

defining a product of the determined maximum value and a predetermined magnification factor as a maximum value of the value range, the predetermined magnification factor being a numerical value greater than 1; and determining that the normal value range of feature values obtained by performing feature extraction on the series of historical status index data of the monitored system according to the recommended feature extraction algorithm is greater than or equal to the minimum value of the value range, and is smaller than or equal to the maximum value of the value range.

6. The method according to claim 1, wherein the monitoring the monitored system according to the recommended feature extraction algorithm and the normal value range comprises:

collecting periodically current status index data of the monitored system and generating a series of current status index data as a monitored series of current status index data;

performing feature extraction on the monitored series of current status index data according to the recommended feature extraction algorithm to obtain feature values of the monitored series of current status index data; and determining the monitored system as abnormal, if the feature values of the monitored series of current status index data are not within the normal value range.

7. The method according to claim 6, further comprising:

determining the monitored system as normal, if the feature values of the monitored series of current status index data are within the normal value range.

8. An apparatus for monitoring a system, comprising:

at least one processor; and a memory storing instructions, which when executed by the at least one processor, cause the at least one processor to perform operations, the operations comprising:
acquiring a series of status index data of a monitored system during at least one data collection period, as a series of historical status index data;
obtaining a feature extraction algorithm matching the series of historical status index data by: introducing the series of historical status index data into a pre-trained recommended feature extraction model to match the series of historical status index data to the feature extraction algorithm according to a pre-trained corresponding relationship between the series of historical status index data and the obtained feature extraction algorithm, the obtained feature extraction algorithm being a recommended feature extraction algorithm, wherein the corresponding relationship between the series of historical status index data and the obtained feature extraction algorithm is characterized by the recommended feature extraction model;
determining a maximum value and a minimum value of feature values obtained by performing feature extraction on the series of historical the status index data according to the recommended feature extraction algorithm, wherein the recommended feature extraction algorithm comprises a period-over-period feature extraction algorithm, or a chain relative feature extraction algorithm, and different recommended feature extraction algorithms correspond to different feature values;
determining, based on the determined maximum value and minimum value, a normal value range of feature values obtained by performing feature extraction on the series of historical status index data of the monitored system according to the recommended feature extraction algorithm, wherein performing feature extraction on the series of historical status index data of the monitored system according to the recommended feature extraction algorithm comprises: calculating, from a second data collection period in the series of historical status index data, a ratio of historical status index data of each data collection period to historical status index data of a previous collection period of the collection period; and defining the calculated ratio as feature values obtained by performing feature extraction on the series of historical status index data according to the period-over-period feature extraction algorithm or the chain relative feature extraction algorithm; and
monitoring the monitored system according to the recommended feature extraction algorithm and the normal value range.

9. The apparatus according to claim 8, the operations further comprising building the recommended feature extraction model, the building the recommended feature extraction model comprising:
obtaining the recommended feature extraction model through training by using a machine learning method, based on a manually labeled series of historical status index data of the monitored system and the feature extraction algorithm corresponding to the series of historical status index data of the monitored system.

10. The apparatus according to claim 8, wherein the obtaining a feature extraction algorithm matching the series of historical status index data by introducing the series of historical status index data into a pre-trained recommended feature extraction model to match the series of historical status index data to the feature extraction algorithm according to a pre-trained corresponding relationship between the series of historical status index data and the feature extraction algorithm, the feature extraction algorithm being a recommended feature extraction algorithm comprises:
introducing the series of historical status index data into the recommended feature extraction model to obtain feature extraction algorithms with a matching degree used to represent an accuracy of determining feature extraction algorithms based on the series of historical status index data; and
defining a feature extraction algorithm of the obtained feature extraction algorithms with a highest matching degree as the recommended feature extraction algorithm.

11. The apparatus according to claim 8, wherein the determining a maximum value and a minimum value of feature values obtained by performing feature extraction on the series of historical status index data according to the recommended feature extraction algorithm comprises:
performing feature extraction on the series of historical status index data according to the recommended feature extraction algorithm to obtain feature values of the series of historical status index data;
acquiring a preset maximum abnormal point proportion and a preset minimum abnormal point proportion based on which the monitored system utilizes the recommended feature extraction algorithm to perform the feature extraction, the preset maximum abnormal point proportion and the preset minimum abnormal point proportion being numerical values greater than or equal to 0 and smaller than 1;
acquiring a number of the obtained feature values as a first number;
calculating a first product of the first number and the preset minimum abnormal point proportion and rounding the calculated first product into a second number, the second number being the rounded first product;
calculating and rounding a second product of the first number and the preset maximum abnormal point proportion to be a third number, the third number being the rounded second product;
calculating a difference between the first number and the third number as a fourth number;
ordering the obtained feature values in an ascending order;
selecting, from the obtained feature values, an $i^{th}$ feature value in the ascending order as the minimum value of feature values obtained by performing feature extraction on the series of historical status index data according to the recommended feature extraction algorithm, i being a sum of the second number and 1; and
selecting, from the obtained feature values, a $j^{th}$ feature value in the ascending order as the maximum value of feature values obtained by performing feature extraction on the series of historical status index data according to the recommended feature extraction algorithm, j being a difference between the fourth number and 1.

12. The apparatus according to claim 8, wherein the determining, based on the determined maximum value and minimum value, a normal value range of feature values obtained by performing feature extraction on the series of historical status index data of the monitored system according to the recommended feature extraction algorithm comprises:

defining a product of the determined minimum value and a predetermined reduction factor as a minimum value of the value range, the predetermined reduction factor being a numerical value greater than 0 and smaller than 1;

defining a product of the determined maximum value and a predetermined magnification factor as a maximum value of the value range, the predetermined magnification factor being a numerical value greater than 1; and determining that the normal value range of feature values obtained by performing feature extraction on the series of historical status index data of the monitored system according to the recommended feature extraction algorithm is greater than or equal to the minimum value of the value range, and is smaller than or equal to the maximum value of the value range.

13. The apparatus according to claim 8, wherein the monitoring the monitored system according to the recommended feature extraction algorithm and the normal value range comprises:

collecting periodically current status index data of the monitored system and generate a series of current status index data as a monitored series of current status index data;

performing feature extraction on the monitored series of current status index data according to the recommended feature extraction algorithm to obtain feature values of the monitored series of current status index data; and determining the monitored system as abnormal, if the feature values of the monitored series of current status index data are not within the normal value range.

14. The apparatus according to claim 8, the operations further comprising:

determining the monitored system as normal, if the feature values of the monitored series of current status index data are within the normal value range.

15. A non-transitory computer storage medium storing a computer program, which when executed by one or more processors, cause the one or more processors to perform operations, the operations comprising:

acquiring a series of status index data of a monitored system during at least one data collection period, as a series of historical status index data;

obtaining a feature extraction algorithm matching the series of historical status index data by: introducing the series of historical status index data into a pre-trained recommended feature extraction model to match the series of historical status index data to the feature extraction algorithm according to a pre-trained corresponding relationship between the series of historical status index data and the obtained feature extraction algorithm, the obtained feature extraction algorithm being a recommended feature extraction algorithm, wherein the corresponding relationship between the series of historical status index data and the obtained feature extraction algorithm is characterized by the recommended feature extraction model;

determining a maximum value and a minimum value of feature values obtained by performing feature extraction on the series of historical status index data according to the recommended feature extraction algorithm, wherein the recommended feature extraction algorithm comprises a period-over-period feature extraction algorithm, or a chain relative feature extraction algorithm, and different recommended feature extraction algorithms correspond to different feature values;

determining, based on the determined maximum value and minimum value, a normal value range of feature values obtained by performing feature extraction on the historical series of status index data of the monitored system according to the recommended feature extraction algorithm, wherein performing feature extraction on the series of historical status index data of the monitored system according to the recommended feature extraction algorithm comprises: calculating, from a second data collection period in the series of historical status index data, a ratio of historical status index data of each data collection period to historical status index data of a previous collection period of the collection period; and defining the calculated ratio as feature values obtained by performing feature extraction on the series of historical status index data according to the period-over-period feature extraction algorithm or the chain relative feature extraction algorithm; and monitoring the monitored system according to the recommended feature extraction algorithm and the normal value range.

16. The non-transitory computer storage medium according to claim 15, the operations further comprising building the recommended feature extraction model, the building the recommended feature extraction model comprising:

obtaining the recommended feature extraction model through training by using a machine learning method, based on a manually labeled series of historical status index data of the monitored system and the feature extraction algorithm corresponding to the series of historical status index data of the monitored system.

17. The non-transitory computer storage medium according to claim 15, wherein the obtaining a feature extraction algorithm matching the series of historical status index data by introducing the series of historical status index data into a pre-trained recommended feature extraction model to match the series of historical status index data to the feature extraction algorithm according to a pre-trained corresponding relationship between the series of historical status index data and the feature extraction algorithm, the obtained feature extraction algorithm being a recommended feature extraction algorithm comprises:

introducing the series of historical status index data into the recommended feature extraction model to obtain feature extraction algorithms with a matching degree used to represent an accuracy of determining feature extraction algorithms based on the series of historical status index data; and defining a feature extraction algorithm of the obtained feature extraction algorithms with a highest matching degree as the recommended feature extraction algorithm.

18. The non-transitory computer storage medium according to claim 15, wherein the determining a maximum value and a minimum value of feature values obtained by performing feature extraction on the series of historical status index data according to the recommended feature extraction algorithm comprises:

performing feature extraction on the series of historical status index data according to the recommended feature extraction algorithm to obtain feature values of the series of historical status index data;

acquiring a preset maximum abnormal point proportion and a preset minimum abnormal point proportion based on which the monitored system utilizes the recommended feature extraction algorithm to perform the feature extraction, the preset maximum abnormal point proportion and the preset minimum abnormal point proportion being numerical values greater than or equal to 0 and smaller than 1;

acquiring a number of the obtained feature values as a first number;

calculating a first product of the first number and the preset minimum abnormal point proportion and rounding the calculated first product into a second number, the second number being the rounded first product;

calculating and rounding a second product of the first number and the preset maximum abnormal point proportion to be a third number, the third number being the rounded second product;

calculating a difference between the first number and the third number as a fourth number;

ordering the obtained feature values in an ascending order;

selecting, from the obtained feature values, an $i^{th}$ feature value in the ascending order as the minimum value of eigenvalues obtained by performing feature extraction on the series of historical status index data according to the recommended feature extraction algorithm, i being a sum of the second number and 1; and selecting, from the obtained feature values, a $j^{th}$ feature value in the ascending order as the maximum value of feature values obtained by performing feature extraction on the series of historical status index data according to the recommended feature extraction algorithm, j being a difference between the fourth number and 1.

* * * * *